(12) United States Patent
Chang

(10) Patent No.: US 8,285,228 B2
(45) Date of Patent: Oct. 9, 2012

(54) SIGNAL TRANSMITTING CIRCUIT AND RELATED METHOD

(75) Inventor: Wen-Hua Chang, Tainan County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 400 days.

(21) Appl. No.: 12/758,041

(22) Filed: Apr. 12, 2010

(65) Prior Publication Data
US 2011/0249711 A1   Oct. 13, 2011

(51) Int. Cl.
*H04B 1/16* (2006.01)
(52) U.S. Cl. ........................................ 455/125; 455/123
(58) Field of Classification Search .................. 455/78, 455/80, 82, 120, 123, 124, 125
See application file for complete search history.

(56) References Cited

U.S. PATENT DOCUMENTS

| 5,029,240 A * | 7/1991 | de La Chapelle et al. ..... 398/202 |
| 7,535,312 B2 * | 5/2009 | McKinzie, III ............... 333/17.3 |
| 8,135,355 B2 * | 3/2012 | Gorbachov ....................... 455/73 |
| 2006/0160501 A1 * | 7/2006 | Mendolia et al. .............. 455/125 |

* cited by examiner

*Primary Examiner* — Blane J Jackson
(74) *Attorney, Agent, or Firm* — Winston Hsu; Scott Margo

(57) ABSTRACT

A signal transmitting circuit includes: a signal generating circuit arranged to generate an output signal to a loading device according to an input signal; an adjusting circuit; and a matching circuit having a first port coupled to the adjusting circuit and a second port coupled to the signal generating circuit, wherein the second port is arranged to couple to the loading device so as to provide a matching impedance corresponding to the loading device; and the adjusting circuit is arranged to generate an adjusting signal of which a voltage applied on the first port is substantially equal to a voltage of the output signal applied on the second port.

19 Claims, 4 Drawing Sheets

SIGNAL TRANSMITTING CIRCUIT AND RELATED METHOD

BACKGROUND

The present invention relates to a signal transmitting circuit and related method, and more particularly to a signal transmitter and system having low power consumption, and a related method for saving power consumption of the signal transmitter.

In a communication system, e.g., an optical fiber communication system, a transmitter is employed to transmit a data signal to a transmission medium, e.g., the optical fiber, in which the transmission medium is responsible for conveying the data signal to a receiver. To maximize the power transferring to the loading device, i.e., the transmission medium in combination with the receiver, a characteristic impedance of the transmitter (i.e., source impedance) should match with the characteristic impedance of the loading device (i.e., load impedance). In other words, the characteristic impedance of the transmitter should equal the characteristic impedance of the loading device. By doing this, however, the characteristic impedance of the transmitter consumes the same power as the power consumed by the characteristic impedance of the loading device. Accordingly, the power efficiency of the transmitter is reduced since not all of the power generated by the transmitter is transferred to the loading device. More seriously, when more power is transmitted to the loading device, more power is wasted by the characteristic impedance of the transmitter. Therefore, providing an efficient way to reduce the power consumption due to the source impedance of the transmitter is a significant concern in the communication system field.

SUMMARY

According to a first embodiment of the invention, a signal transmitting circuit is provided. The signal transmitting circuit comprises a signal generating circuit, an adjusting circuit, and a matching circuit. The signal generating circuit is arranged to generate an output signal to a loading device according to an input signal. The matching circuit has a first port coupled to the adjusting circuit and a second port coupled to the signal generating circuit, wherein the second port is arranged to couple to the loading device so as to provide a matching impedance corresponding to the loading device. The adjusting circuit is arranged to generate an adjusting signal of which a voltage applied on the first port is substantially equal to a voltage of the output signal applied on the second port.

According to a second embodiment of the invention, a signal transmitting circuit is provided. The signal transmitting circuit comprises a matching circuit, a signal generating circuit, and an adjusting circuit. The matching circuit has a first port and a second port, and is arranged to provide a matching impedance corresponding to a loading device. The signal generating circuit is arranged to generate an output voltage applied on the second port according to an input signal. The adjusting circuit is arranged to generate an adjusting voltage applied on the first port substantially equal to the output voltage.

According to a third embodiment of the invention, a signal transmitting method is provided. The signal transmitting method comprises the steps of: providing a matching circuit having a first port and a second port to provide a matching impedance corresponding to a loading device; generating an output voltage applied on the second port according to an input signal; and generating an adjusting voltage applied on the first port substantially equal to the output voltage.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
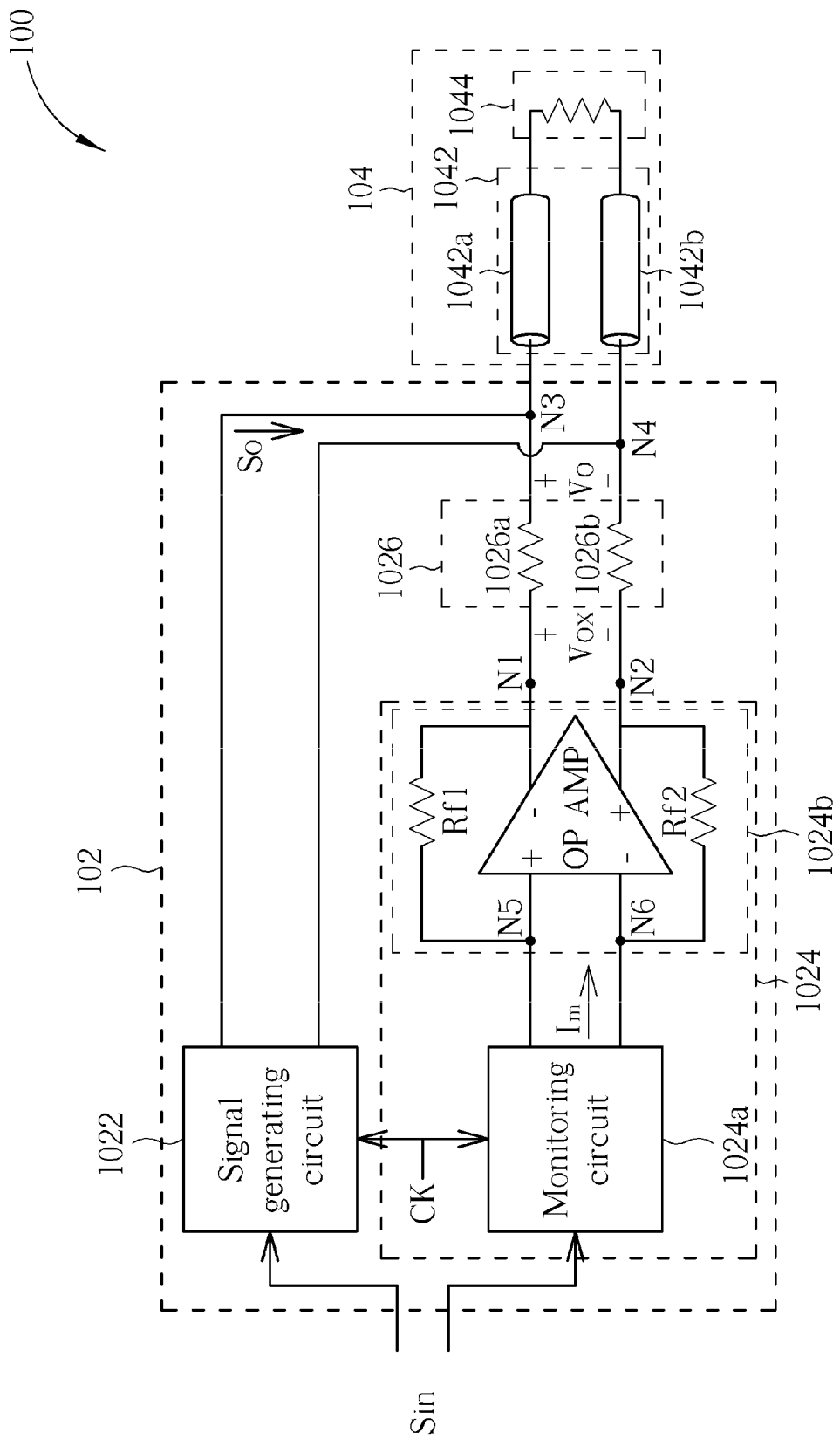
FIG. 1 is a diagram illustrating a signal transmitting system according to a first embodiment of the present invention.

FIG. 1 is a diagram illustrating a signal transmitting system 100 according to a first embodiment of the present invention. The signal transmitting system 100 comprises a signal transmitting circuit 102 and a loading device 104, in which the signal transmitting circuit 102 transmits a data signal to the loading device 104, and the loading device 104 may include a transmission medium 1042 and a load 1044. For example, the transmission medium 1042 may be an optical fiber. The signal transmitting circuit 102 comprises a signal generating circuit 1022, an adjusting circuit 1024, and a matching circuit 1026. Please note that the exemplary embodiment signal transmitting system 100 is a differential transmitting system, but this is not meant to be a limitation of the present invention. A single ended transmitting system also belongs to the scope of the present invention.

The signal generating circuit 1022 is arranged to generate an output signal So to the loading device 104 according to an input signal Sin, in which the input signal Sin is the pre-transmitted data signal and synchronized with an input clock CK. Furthermore, in an embodiment, the signal generating circuit 1022 is a digital-to-analog converter for converting the digital input data into the analog output signal So. For example, the output signal So may be a current signal. The matching circuit 1026 has a first port coupled to the adjusting circuit 1024 and a second port coupled to the signal generating circuit 1022, wherein the second port is arranged to couple to the loading device 104 so as to provide a matching impedance corresponding to the loading device 104. The adjusting circuit 1024 is arranged to generate an adjusting signal (e.g., the voltage Vox) of which a voltage applied on the first port is substantially equal to a voltage Vo of the output signal So applied on the second port. In one embodiment, the adjusting circuit 1024 can be arranged to generate the adjusting signal Vox based on the input signal Sin, and in another embodiment, the adjusting circuit 1024 can be arranged to make the adjusting signal Vox track the output signal So.

For the case of generating the adjusting signal Vox based on the input signal Sin, the adjusting circuit 1024 may be implemented by a digital-to-analog converter for converting the input signal Sin into the adjusting signal Vox, or the adjusting circuit 1024 may be a replica of the signal generating circuit 1022 for generating the adjusting signal Vox based on the input signal Sin. For the case of making the adjusting signal Vox to track the output signal So, the adjusting circuit 1024 may be implemented by a current mirror for tracking the output signal So to generate the adjusting signal Vox. Please note that, the adjusting circuit 1024 may be implemented by any type of tracking circuit having the capability of making the adjusting signal Vox to track the output signal So.

Since the signal transmitting system 100 is a differential transmitting system, the signal transmitting circuit 102 is the differential transmitting circuit, and the output signal So and the adjusting signal Vox are differential signal pairs. Accordingly, the first port of the matching circuit 1026 comprises two terminals N1, N2, the second port of the matching circuit 1026 comprises two terminals N3, N4, and the detailed connections between the signal generating circuit 1022, the adjusting circuit 1024, the matching circuit 1026, and the loading device 104 are shown in FIG. 1. Therefore, the voltage Vo is the voltage drop across the terminals N1, N2, and the adjusting signal Vox is the voltage drop across the terminals N3, N4.

In addition, the signal transmitting circuit 102 is utilized in Ethernet application. When the signal transmitting circuit 102 operates under a 10 Mhz transmission mode in the Ethernet application, the signal generating circuit 1022 is arranged to generate the output signal So to the loading device 104 according to the input signal Sin, and the adjusting circuit 1024 is arranged to generate the adjusting signal Vox of which the voltage applied on the first port is substantially equal to the voltage Vo of the output signal So applied on the second port. However, when the signal transmitting circuit 102 operates under a second transmission mode having a transmission rate faster than the first transmission mode in the Ethernet application, the signal generating circuit 1022 is disable and the adjusting circuit 102 is arranged to generate the output signal (e.g., Vo in FIG. 1) to the loading device 104 according to the input signal Sin. More specifically, when the signal transmitting circuit 102 operates under the second transmission mode, the terminals N3, N4 are disconnected from the signal generating circuit 1022. In other words, the output of the signal generating circuit 1022 are floating when the signal transmitting circuit 102 operates under the second transmission mode and the adjusting circuit 102 acts as a signal transmitting circuit to generate the output signal (e.g., the voltage Vo in FIG. 1) according to the input signal Sin. Therefore, when the signal transmitting circuit 102 operates under the second transmission mode, the voltage of the adjusting signal Vox applied on the first port may different from the voltage of the output signal (e.g., the voltage Vo in FIG. 1) applied on the second port.

The transmission medium 1042 comprises: a first transmission path 1042a having a first terminal coupled to the terminal N3 and a second terminal coupled to a first terminal of the load 1044; and a second transmission path 1042b having a first terminal coupled to the terminal N4 and a second terminal coupled to a second terminal of the load 1044. The matching circuit 1026 comprises: a first matching resistor 1026a having a first terminal coupled to the terminal N3 and a second terminal coupled to the terminal N1; and a second matching resistor 1026b having a first terminal coupled to the terminal N4 and a second terminal coupled to the terminal N2. The first matching resistor 1026a and the second matching resistor 1026b have the same impedance, and the total impedance of the first matching resistor 1026a and the second matching resistor 1026b is equal to the input impedance Rl of the loading device 104.

Furthermore, the adjusting circuit 1024 comprises a monitoring circuit 1024a and a converting circuit 1024b. The monitoring circuit 1024a is coupled to the signal generating circuit 1022 for monitoring a current signal corresponding to the output signal So to generate a monitoring result Im. In an embodiment, the monitoring circuit 1024a is a replica of the signal generating circuit 1022. In another embodiment, the monitoring circuit 1024a is a current mirror. The converting circuit 1024b has a first terminal N5 and a second terminal N6 coupled to the monitoring circuit 1024a for receiving the monitoring result Im, and a third terminal and a fourth terminal coupled to the terminal N1 and the terminal N2 of the matching circuit 1026, respectively, for outputting the adjusting signal Vox according to the monitoring result Im. Please note that, in another embodiment, the monitoring circuit 1024a may also be a signal generating circuit, such as a digital-to-analog converter receiving the same input signal Sin and input clock CK as the signal generating circuit 1022 as shown in FIG. 1, rather than a monitoring circuit. In other words, any other functional circuits capable of generating a signal having a corresponding relationship with the output signal So also belong to the scope of the adjusting circuit 1024.

In this embodiment, the monitoring result Im is a monitoring current corresponding to the current signal of the output signal So, and the converting circuit 1024b converts the monitoring current into the adjusting signal Vox in voltage form. Thus, the converting circuit 1024b is a trans-impedance circuit. The converting circuit 1024b comprises an operational amplifier OP-AMP, such as a class AB amplifier, a first feedback resistor Rf1, and a second feedback resistor Rf2, wherein the first feedback resistor Rf1 and the second feedback resistor Rf2 have the same resistance, the first feedback resistor Rf1 is coupled between the positive input terminal (+) (i.e., N5) and the negative output terminal (−) (i.e., N1) of the operational amplifier OP-AMP, and the second feedback resistor Rf2 is coupled between the negative input terminal (−) (i.e., N6) and the positive output terminal (+) (i.e., N2) of the operational amplifier OP-AMP. Please note that, the first feedback resistor Rf1 and the second feedback resistor Rf2 are set as a predetermined resistance such that a power consumption of the converting circuit 1024b lower than a power consumption of the signal generating circuit 1022.

When the digital input signal Sin is inputted to the signal generating circuit 1022, the signal generating circuit 1022 generates the output signal So corresponding to the digital input signal Sin to the terminals N3, N4. Then, the voltage Vo generated in accordance with the output signal So appears at the terminals N3, N4 and is transmitted to the loading device 104. Meanwhile, the monitoring circuit 1024a monitors the output signal So to generate the monitoring current (i.e., Im), and the converting circuit 1042b converts the monitoring current into the adjusting signal Vox. Since the voltage level of the adjusting signal Vox is designed to equal the voltage Vo, there is no current flowing through the matching circuit 1026, and all of the current (i.e., the current of output signal So)

generated by the signal generating circuit 1022 flows to the loading device 104. In other words, the adjusting circuit 1024 is arranged to resist a current flowing through the matching circuit 1026. Therefore, the matching circuit 1026 of the signal transmitting system 100 does not consume any power while still providing the matching impedance corresponding to the loading device 104, and the loading device 104 consumes all of the power outputted by the signal generating circuit 1022. Accordingly, the signal transmitting system 100 has higher power efficiency than in the related art.

Figure 2:
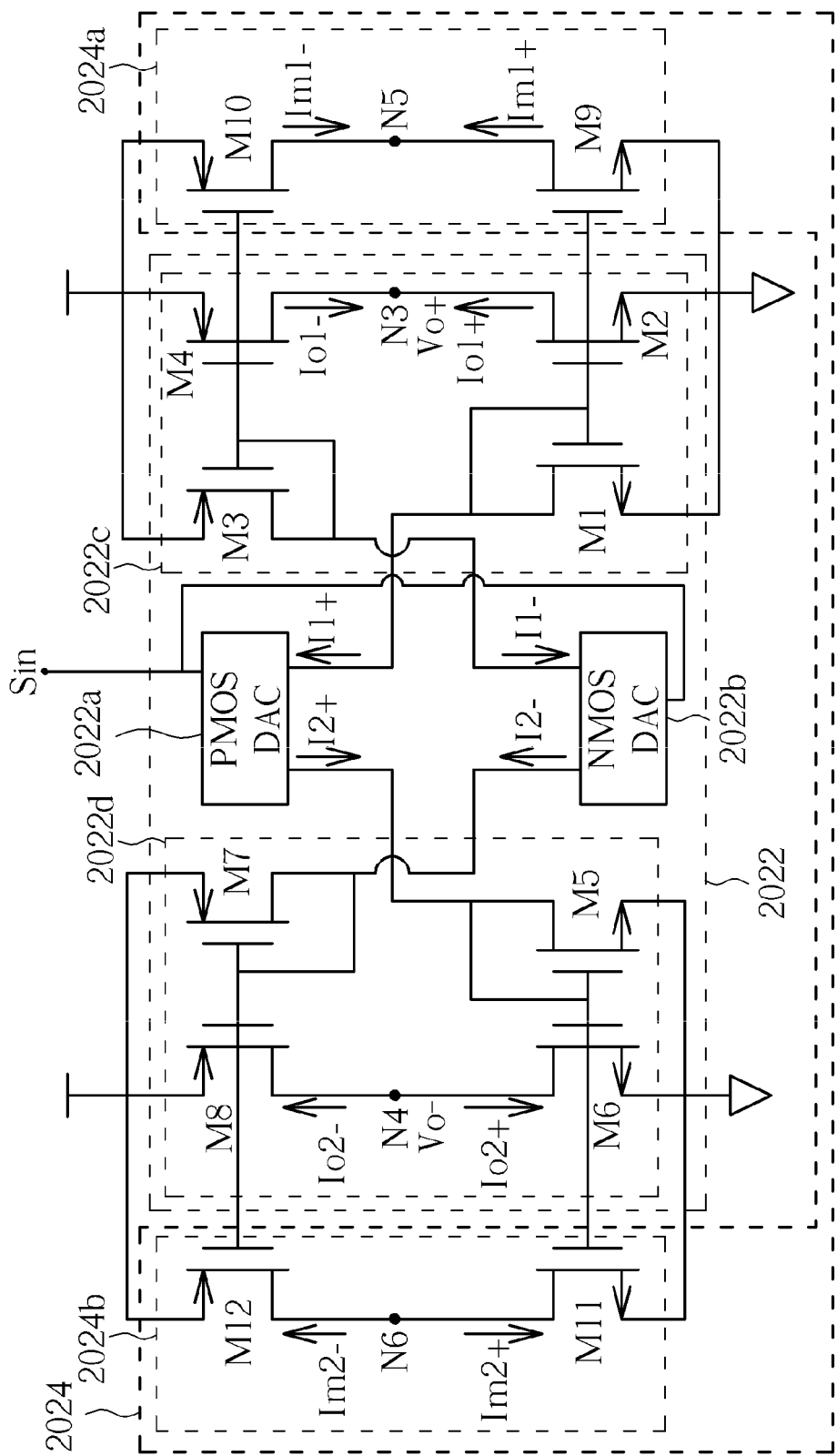
FIG. 2 is a diagram illustrating a signal generating circuit and an adjusting circuit of the signal transmitting system according to a second embodiment of the present invention.

FIG. 2 is a diagram illustrating a signal generating circuit 2022 and an monitoring circuit 2024 according to a second embodiment of the present invention. The signal generating circuit 2022 comprises a PMOS (P-type Metal-oxide-semiconductor) digital-to-analog converter 2022a, an NMOS (N-type Metal-oxide-semiconductor) digital-to-analog converter 2022b, a first current mirror 2022c, and a second current mirror 2022d. The monitoring circuit 2024 is a replica of the signal generating circuit 2022, and the monitoring circuit 2024 comprises a first mirroring circuit 2024a and a second mirroring circuit 2024b.

The PMOS digital-to-analog converter 2022a receives the input signal Sin and converts the input signal Sin into the analog signals, i.e., the first positive current I1+ and the second positive current I2+. The NMOS digital-to-analog converter 2022b receives the input signal Sin and converts the input signal Sin into the other analog signals, i.e., the first negative current I1− and the second negative current I2−. The first current mirror 2022c comprises N-type transistors M1, M2, and P-type transistors M3, M4, wherein the N-type transistor M1 in combination with the N-type transistor M2 mirrors the first positive current I1+ generated by the PMOS digital-to-analog converter 2022a to generate a first positive output current Io1+, and the P-type transistor M3 in combination with the P-type transistor M4 mirrors the first negative current I1− generated by the NMOS digital-to-analog converter 2022b to generate a first negative output current Io1−. The second current mirror 2022d comprises N-type transistors M5, M6, and P-type transistors M7, M8, wherein the N-type transistor M5 in combination with the N-type transistor M6 mirrors the second positive current I2+ generated by the PMOS digital-to-analog converter 2022a to generate a second positive output current Io2+, and the P-type transistor M7 in combination with the P-type transistor M8 mirrors the second negative current I2− generated by the NMOS digital-to-analog converter 2022b to generate a second negative output current Io2−. Please note that the drain of the N-type transistor M2 is coupled to the drain of the P-type transistor M4, i.e., the terminal N3 as shown in FIG. 1, and the drain of the N-type transistor M6 is coupled to the drain of the P-type transistor M8, i.e., the terminal N4 as shown in FIG. 1, therefore the voltage Vo is (Vo+)−(Vo−), wherein Vo+ is the voltage at the terminal N3, and Vo− is the voltage at the terminal N4.

In addition, the first mirroring circuit 2024a comprises an N-type transistor M9 and a P-type transistor M10, wherein the N-type transistor M9 mirrors the first positive output current Io1+ to generate a first positive mirror current Im1+, and the P-type transistor M10 mirrors the first negative output current Io1− to generate a first negative mirror current Im1−. The second mirroring circuit 2024b comprises an N-type transistor M11 and a P-type transistor M12, wherein the N-type transistor M11 mirrors the second positive output current Io2+ to generate a second positive mirror current Im2+, and the P-type transistor M12 mirrors the second negative output current Io2− to generate a second negative mirror current Im2−. Furthermore, the drain of the N-type transistor M9 is coupled to the drain of the P-type transistor M10, i.e., the terminal N5 as shown in FIG. 1, and the drain of the N-type transistor M11 is coupled to the drain of the P-type transistor M12, i.e., the terminal N6 as shown in FIG. 1, therefore the monitoring result Im is generated according to the first positive mirror current Im1+, the first negative mirror current Im1−, the second positive mirror current Im2+, and the second negative mirror current Im2−.

Please note that the mirroring ratio of the monitoring circuit 2024 over the signal generating circuit 2022 is smaller than one in order to reduce the power consumption of the monitoring circuit 2024. More specifically, the first positive mirror current Im1+ and the first negative mirror current Im1− are smaller than the first positive output current Io1+ and the first negative output current Io1− respectively, and the second positive mirror current Im2+ and the second negative mirror current Im2− are smaller than the second positive output current Io2+ and the second negative output current Io2− respectively. By doing so, the power consumption of the monitoring circuit 2024 can be reduced to an extremely low level while still generating the adjusting signal Vox that is equal to the output signal Vo. Thus, the power efficiency of the signal transmitting circuit 102 is increased.

In addition, it should be noted that the monitoring circuit 2024 in FIG. 2 only comprises a partial circuits of the monitoring circuit 1024a in FIG. 1, this is because FIG. 2 is the schematic diagram showing merely the involved circuits in the signal generating circuit 1022 and the monitoring circuit 1024a when the signal transmitting circuit 102 operates under a certain transmission mode (e.g., the 10 MHz transmission mode in the Ethernet application). Therefore, another digital-to-analog converter may be required to receive and convert the input signal Sin into the analog signals for the monitoring circuit 2024 when the signal transmitting circuit 102 operates under another transmission mode while the signal generating circuit 1022 is disable in this mode. However, it is also should be noted that the digital-to-analog converter in the signal generating circuit 1022 (i.e., the PMOS digital-to-analog converter 2022a and the NMOS digital-to-analog converter 2022b) may again be arranged to receive and convert the input signal Sin into the analog signals for the monitoring circuit 2024 when the signal transmitting circuit 102 operates under the another transmission mode.

Figure 3:
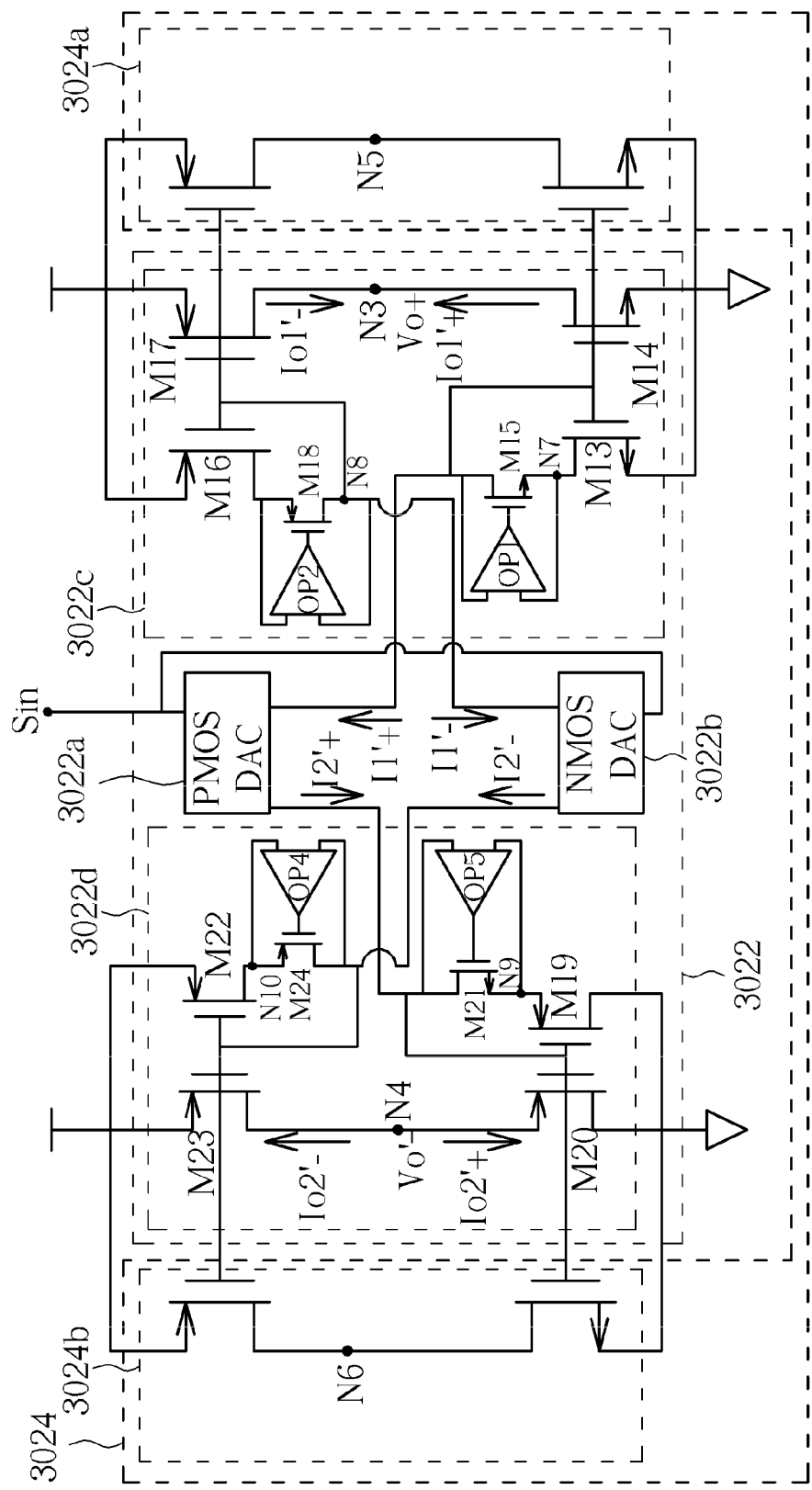
FIG. 3 is a diagram illustrating a signal generating circuit and an adjusting circuit according to a third embodiment of the present invention.

FIG. 3 is a diagram illustrating a signal generating circuit 3022 and an monitoring circuit 3024 according to a third embodiment of the present invention. The signal generating circuit 3022 comprises a PMOS (P-type Metal-oxide-semiconductor) digital-to-analog converter 3022a, an NMOS (N-type Metal-oxide-semiconductor) digital-to-analog converter 3022b, a first current mirror 3022c, and a second current mirror 3022d. The monitoring circuit 3024 is a replica of the signal generating circuit 3022, and the monitoring circuit 3024 comprises a first mirroring circuit 3024a and a second mirroring circuit 3024b. The PMOS digital-to-analog converter 3022a receives the input signal Sin and converts the input signal Sin into the analog signals, i.e., the first positive current I1′+ and the second positive current I2′+. The NMOS digital-to-analog converter 3022b receives the input signal Sin and converts the input signal Sin into the other analog signals, i.e., the first negative current I1′− and the second negative current I2′−. The first current mirror 3022c comprises N-type transistors M13, M14, M15, P-type transistors M16, M17, M18, and operational amplifiers OP1, OP2. The second current mirror 3022d comprises N-type transistors M19, M20, M21, P-type transistors M22, M23, M24, and operational amplifiers OP3, OP4.

In this embodiment, the N-type transistor M13 in combination with the N-type transistor M14 mirrors the first positive current I1'+ generated by the PMOS digital-to-analog converter 3022a to generate a first positive output current Io1'+, and the P-type transistor M16 in combination with the P-type transistor M17 mirrors the first negative current I1'− generated by the NMOS digital-to-analog converter 3022b to generate a first negative output current Io1'−. Furthermore, the operational amplifier OP1 in combination with the N-type transistor M15 are arranged to lock the voltage at terminal N7 to the output voltage Vo'+ so that the voltage at terminal N7 equals the output voltage Vo'+. By doing so, the ratio between the first positive output current Io1'+ and the first positive current I1'+ can be fixed at a predetermined mirroring ratio. Similarly, the operational amplifier OP2 in combination with the P-type transistor M18 are arranged to lock the voltage at terminal N8 to the output voltage Vo'+ so that the voltage at terminal N8 equals the output voltage Vo'+, the operational amplifier OP3 in combination with the N-type transistor M21 are arranged to lock the voltage at terminal N9 to the output voltage Vo'− so that the voltage at terminal N9 equals the output voltage Vo'−, and the operational amplifier OP4 in combination with the P-type transistor M24 are arranged to lock the voltage at terminal N10 to the output voltage Vo'− so that the voltage at terminal N10 equals the output voltage Vo'−.

In addition, the drain of the N-type transistor M14 is coupled to the drain of the P-type transistor M17, and the drain of the N-type transistor M20 is coupled to the drain of the P-type transistor M23, therefore the voltage Vo is (Vo'+)−(Vo'−) as shown in FIG. 3. Please note that, since the operations and settings of the first mirroring circuit 3024a and the second mirroring circuit 3024b are similar to the first mirroring circuit 2024a and the second mirroring circuit 2024b respectively, the detailed description is omitted here for brevity.

Figure 4:
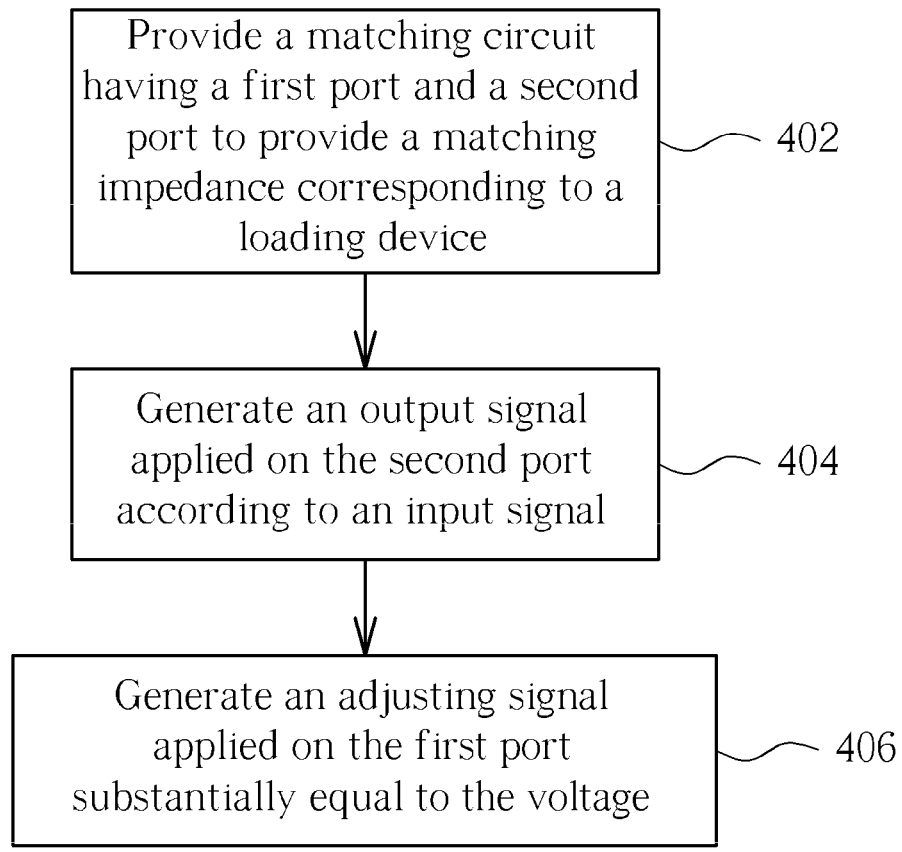
FIG. 4 is a flowchart illustrating a signal transmitting method according to a fourth embodiment of the present invention.

The operation of the above-mentioned signal transmitting system 100 and the signal transmitting circuit 102 can be summarized as steps 400-412 as shown in FIG. 4. FIG. 4 is a flowchart illustrating a signal transmitting method 400 according to a third embodiment of the present invention. Provided that substantially the same result is achieved, the steps of the flowchart shown in FIG. 4 need not be in the exact order shown and need not be contiguous, that is, other steps can be intermediate. The signal transmitting method 400 comprises the following steps:

Step 402: Provide the matching circuit 1026 having the first port and the second port to provide a matching impedance corresponding to the loading device 104;

Step 404: Generate the output signal So applied on the second port according to the input signal Sin; and Step 406: Generate the adjusting signal Vox applied on the first port substantially equal to the voltage Vo.

In step 406, when the voltage of the adjusting signal Vox substantially equals the voltage Vo, there is no current flowing through the matching circuit 1026, therefore the matching circuit 1026 consumes no power when the signal transmitting circuit 102 generates the output signal So to the loading device 104. Thus, the loading device 104 consumes all of the power outputted by the signal generating circuit 1022. In addition, in step 406, the adjusting signal Vox is generated through mirroring the current signal of the output signal So according to a mirroring ratio smaller than one, therefore the power consumption of the monitoring circuit 2024 can be reduced to an extremely low level as mentioned in the above-paragraph. Accordingly, the signal transmitting system 100 applying the signal transmitting method 400 has higher power efficiency than in the related art.

Briefly, by preventing the current from flowing through the matching circuit 1026, the power consumption of the source impedance is reduced thereby increasing the power efficiency of the signal transmitting circuit 102, while the source impedance of the signal transmitting circuit 102 is matched to the load impedance of the loading device 104.

Those skilled in the art will readily observe that numerous modifications and alterations of the device and method may be made while retaining the teachings of the invention.

What is claimed is:

1. A signal transmitting circuit, comprising:
   a signal generating circuit, arranged to generate an output signal to a loading device according to an input signal;
   an adjusting circuit; and
   a matching circuit, having a first port coupled to the adjusting circuit and a second port coupled to the signal generating circuit, wherein the second port is arranged to couple to the loading device so as to provide a matching impedance corresponding to the loading device;
   wherein the adjusting circuit is arranged to generate an adjusting signal of which a voltage applied on the first port is substantially equal to a voltage of the output signal applied on the second port.

2. The signal transmitting circuit of claim 1, wherein the adjusting circuit is arranged to generate the adjusting signal based on the input signal.

3. The signal transmitting circuit of claim 1, wherein the adjusting circuit is arranged to make the adjusting signal track the output signal.

4. The signal transmitting circuit of claim 1, being utilized under a first transmission mode in an Ethernet application, wherein when the signal transmitting circuit operates under a second transmission mode different from the first transmission mode in the Ethernet application, the signal generating circuit is disable and the adjusting circuit is arranged to generate the output signal to the loading device according to the input signal of which a voltage of the adjusting signal applied on the first port is different from a voltage of the output signal applied on the second port.

5. The signal transmitting circuit of claim 4, wherein the first transmission mode is a 10 MHz transmission mode, and the second transmission mode has a transmission rate faster than that of the first transmission mode.

6. The signal transmitting circuit of claim 1, wherein the adjusting circuit is arranged to prevent a current from flowing through the matching circuit.

7. The signal transmitting circuit of claim 1, wherein the adjusting circuit comprises:
   a monitoring circuit, arranged to monitor a current signal corresponding to the output signal to generate a monitoring current smaller than the current signal; and
   a converting circuit, arranged to convert the monitoring current into the adjusting signal applying on the first port.

8. The signal transmitting circuit of claim 7, wherein the monitoring circuit is a current mirror.

9. The signal transmitting circuit of claim 7, wherein the signal generating circuit comprises:
   a digital-to-analog circuit, arranged to convert the input signal into an analog signal; and
   a specific current mirror, arranged to generate the current signal according to the analog signal.

10. The signal transmitting circuit of claim 7, wherein the converting circuit is a trans-impedance circuit having a feedback circuit with a first terminal receiving the monitoring current and a second terminal outputting the adjusting signal, the monitoring circuit is a replica of the signal generating circuit, and the feedback circuit of the trans-impedance circuit is set to have a predetermined resistance such that a power consumption of the trans-impedance circuit lower than a power consumption of the signal generating circuit.

11. A signal transmitting circuit, comprising:
   a matching circuit having a first port and a second port, arranged to provide a matching impedance corresponding to a loading device;
   a signal generating circuit, arranged to generate an output voltage applied on the second port according to an input signal; and
   an adjusting circuit, arranged to generate an adjusting voltage applied on the first port substantially equal to the output voltage.

12. The signal transmitting circuit of claim 11, wherein the adjusting circuit is arranged to generate the adjusting voltage based on the input signal.

13. The signal transmitting circuit of claim 11, wherein the adjusting circuit is arranged to make the adjusting voltage track the output voltage.

14. The signal transmitting circuit of claim 11, being utilized under a first transmission mode in an Ethernet application, wherein when the signal transmitting circuit operates under a second transmission mode faster than the first transmission mode in the Ethernet application, the signal generating circuit is disable and the adjusting circuit is arranged to generate the output voltage to the loading device according to the input signal of which the adjusting voltage applied on the first port is different from the output voltage applied on the second port.

15. A signal transmitting method, comprising:
   providing a matching circuit having a first port and a second port to provide a matching impedance corresponding to a loading device;
   generating an output voltage applied on the second port according to an input signal; and
   generating an adjusting voltage applied on the first port substantially equal to the output voltage.

16. The signal transmitting method of claim 15, wherein the step of generating the adjusting voltage comprises:
   generating the adjusting voltage based on the input signal.

17. The signal transmitting method of claim 15, wherein the step of generating the adjusting voltage comprises:
   making the adjusting voltage track the output voltage.

18. The signal transmitting method of claim 15, wherein the step of generating the adjusting voltage comprises:
   monitoring a current signal corresponding to the output voltage to generate a monitoring current smaller than the current signal; and
   converting the monitoring current into the adjusting voltage applying on the first port.

19. The signal transmitting method of claim 18, wherein the step of generating the output voltage comprises:
   converting the input signal into an analog signal; and
   generating the current signal according to the analog signal.

* * * * *